No. 783,357. PATENTED FEB. 21, 1905.
C. S. BISSELL.
TOY OR PUZZLE.
APPLICATION FILED DEC. 14, 1904.

Inventor
Clinton S. Bissell,
Witnesses
By Victor J. Evans
Attorney

No. 783,357.

Patented February 21, 1905.

UNITED STATES PATENT OFFICE.

CLINTON S. BISSELL, OF FLUSHING, NEW YORK.

TOY OR PUZZLE.

SPECIFICATION forming part of Letters Patent No. 783,357, dated February 21, 1905.

Application filed December 14, 1904. Serial No. 236,829.

*To all whom it may concern:*

Be it known that I, CLINTON S. BISSELL, a citizen of the United States, residing at No. 96 Main street, Flushing, in the county of Queens and State of New York, have invented new and useful Improvements in Toys or Puzzles, of which the following is a specification.

This invention relates to toys or puzzles of that class comprising a receptacle containing one or more balls or pellets which are adapted by more or less skilful manipulation of said receptacle to be properly positioned and caught within a trap.

The object of the invention is to provide a toy or puzzle of this type having a receptacle, partially or wholly transparent, containing a fluid on which the object or objects to be trapped are free to float and a trap having its mouth or entrance normally disposed above the level of the fluid, so that by tilting the receptacle the body of fluid may be made to change its relative position, thereby enabling the balls or pellets to be caught or floated into the trap.

With this and other objects in view the invention consists of the features of construction, combination, and arrangements of parts hereinafter fully described, reference being had to the accompanying drawings, in which—

Figure 1:
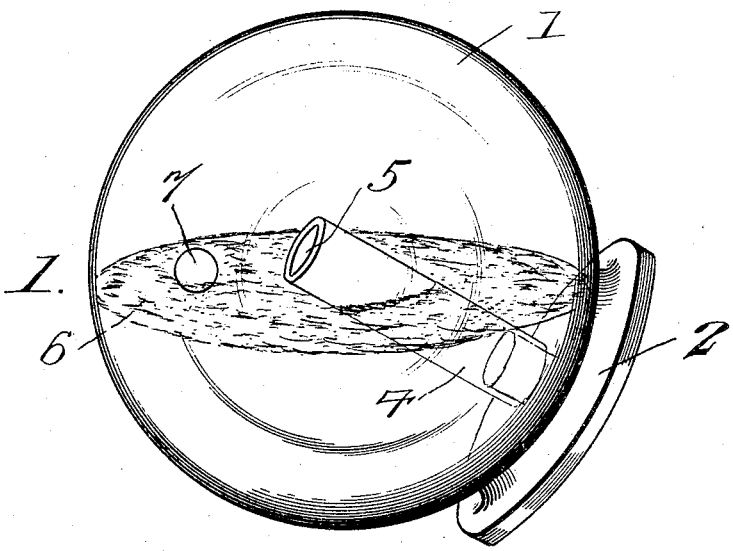
Figure 2:
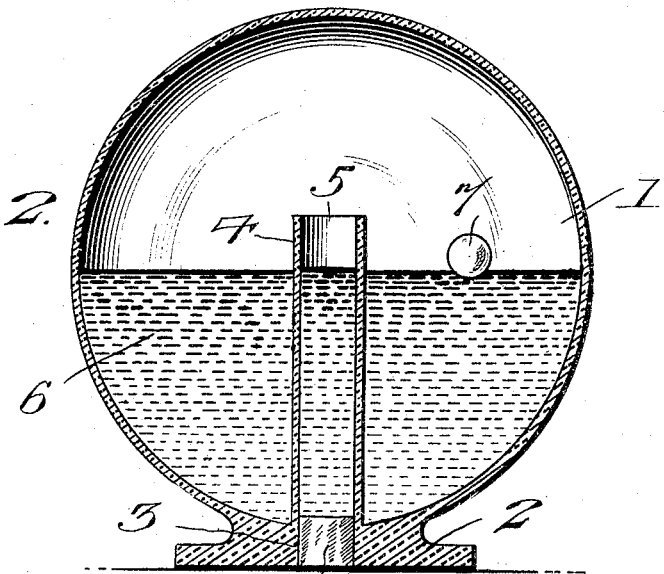

Figure 1 is a perspective view of the puzzle or trap embodying my invention, showing the same tilted to change the position of the trap and the body of fluid and permit the balls or pellets to be brought into proper relation to the mouth of the trap to be caught or floated therein. Fig. 2 is a central vertical section of the toy or puzzle, showing it supported in its normal position.

Referring now more particularly to the drawings, the numeral 1 represents a receptacle, shown in the present instance in the form of a globe or sphere, which may be made of glass or other suitable transparent material or provided at any convenient point with a transparent portion through which the contents thereof may be viewed from without to enable the object to be trapped to be properly manipulated. This receptacle is provided with a base 2, adapting it to be supported in its normal position and which also forms a handle or grip by which the said receptacle may be tilted or manipulated to effect the solution of the puzzle.

Extending through the base of the globe is a filling-opening 3, disposed in communication or registration with a tube 4, extending vertically from the base 2 up into the bulb or sphere 1 and having its upper end 5, which forms a mouth or inlet, projecting a short distance above the horizontal central line of the bulb. This tube serves the double function of a filling device to enable the bulb to be filled with fluid and a trap to catch the balls or pellets floating upon the fluid.

The bulb or sphere 1 contains a body of fluid 6, which may be of any preferred character and which rises therein to a point coincident with or slightly above the horizontal center of the bulb, so that when the puzzle is supported in its normal position, as shown in Fig. 2, the surface of the fluid will lie a short distance below the mouth or entrance end 5 of the tube 4. One or more balls or pellets 7 are disposed within the receptacle and float upon the body of fluid and are designed to be seated in the trap 5 formed by the mouth of the tube 4. In practice any number of these balls may be used, and it is preferred to color the fluid 6 a suitable shade and to make the balls or pellets 7 of a contrasting shade or color, thus enhancing the attractiveness of the device, while permitting the balls or pellets to show with greater distinctiveness from the outside of the bulb to enable them to be manipulated and trapped with greater facility.

The puzzle is first primed for use by inverting the bulb or sphere 1 and then first introducing the bulb or pellets 7 and subsequently the fluid 6 through the filling-opening 3 and the tube 4, after which the opening 3 is closed by a suitable stopper or seal 8 and the puzzle restored to an erect position, as shown in Fig. 2. The device is then in condition for use and is employed by tilting it to the position shown in Fig. 1, so as to cause the body of fluid 6 to change its position in the bulb or sphere 1 to bring the surface thereof in close proximity to the lower portion of the trap 5. When the parts have assumed this position, the trap 5 will be properly disposed to receive the balls or pellets 7, and the object is to so manipulate the device when the elements are so arranged that the balls or pellets may be floated upon the surface of the liquid to a point adjacent to the mouth of the trap and caught or floated therein. This operation requires considerable skill, owing to the fact that attractions, due to the surface tension of the liquid, first, between the balls or pellets and the trap 5, and, second, between the balls or pellets and the nearest point of the bulb or sphere, cause the balls or pellets to move erratically and assume sudden and unexpected positions. By the proper exercise, however, of skill and patience the ball or pellet may be brought into proper position and caught by or floated into the trap and kept seated therein by proper manipulation while the bulb or sphere is being brought to an erect or inverted position. Owing to the fact that the device must be held with a steady hand and the movements of the balls and pellets gaged with accuracy by the eye, the operation affords good practice for the nerves and is also a source of considerable interest and amusement, since the balls tend to move in all directions on the surface of the body of the fluid and to elude capture when capture seems most imminent.

It is preferred to make the receptacle, its base, and the tube or trap of an integral structure of glass; but any other suitable material may be used, provided the receptacle be furnished with a transparent portion through which the balls or pellets and the trap may be viewed and their operation controlled from the exterior. The balls or pellets may be made of cork or other suitable material which will float freely on the surface of the contained liquid and will have sufficient life or celerity of movement to add to the zest and attractiveness of the puzzle.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new, and desired to be secured by Letters Patent, is—

1. A toy comprising a receptacle to be held in and moved by the hand, a movable pellet therein, a body of fluid on which the pellet floats, and a trap having its mouth disposed normally above the surface of the fluid and adapted by manipulation of the receptacle to be brought in such relative position to the surface of the fluid that the ball or pellet may be caught or floated therein.

2. A toy comprising a transparent receptacle, containing a body of fluid and a pellet adapted to float thereon, and having a trap into which the ball is adapted to be caught or floated, said trap also serving as a conductor for the introduction of the fluid in said receptacle.

3. A toy or puzzle comprising a globular receptacle of transparent material containing a body of fluid and one or more pellets adapted to float thereon, and having a base provided with a filling-opening, and a closure therefor, and a trap projecting above the surface of the fluid and adapted by the manipulation of the receptacle to be brought into position to receive the pellet or pellets.

4. A toy or puzzle comprising a receptacle having a trap therein, a body of fluid having its surface normally disposed below the level of said trap, and one or more pellets floating on said fluid and adapted by manipulation of said receptacle to be brought into position to be caught by or floated into the trap.

5. A toy or puzzle comprising a globular receptacle having a filling-opening and a filling-tube extending thereinto from said opening, the upper portion of said tube forming a trap, a closure for the filling-opening, a body of fluid in the tube having its surface normally disposed below the trap, and one or more balls or pellets floating on the body of fluid and adapted by manipulation of the receptacle to be brought into position to be caught or floated into the trap substantially as described.

In testimony whereof I affix my signature in presence of two witnesses.

CLINTON S. BISSELL.

Witnesses:
H. S. BABCOCK, Jr.,
D. P. PUGH.